United States Patent [19]
Achorn et al.

[11] 3,794,740
[45] Feb. 26, 1974

[54] RUMINANT DIRECT FEEDING SUSPENSION SUPPLEMENT

[75] Inventors: Frank P. Achorn; J. Frank Anderson, Jr., both of Florence, Ala.

[73] Assignee: Tennessee Valley Authority, Muscle Shoals, Ala.

[22] Filed: Mar. 31, 1972

[21] Appl. No.: 240,290

Related U.S. Application Data

[63] Continuation of Ser. No. 191,853, Oct. 22, 1971.

[52] U.S. Cl............... 426/69, 426/71, 426/74, 426/213, 426/807, 71/64 C
[51] Int. Cl. ................. A23k 1/02, A23k 1/22
[58] Field of Search......... 99/2 ND, 6; 71/1, 26, 28, 99/64 C, 71/34, 36; 423/315, 306

[56] References Cited
UNITED STATES PATENTS

| | | | |
|---|---|---|---|
| 3,684,518 | 8/1972 | Wortham | 99/6 |
| 3,582,311 | 6/1971 | Browder | 71/64 C |
| 3,290,140 | 12/1966 | Young | 71/64 C |
| 3,512,986 | 5/1970 | Snyder | 99/2 ND |
| 3,523,798 | 8/1970 | Kail | 99/2 ND |
| 3,653,909 | 4/1972 | Wilson | 99/6 |
| 3,509,066 | 4/1970 | Jacobs et al. | 71/64 C |
| 896,056 | 3/1972 | Meline | 71/34 |

OTHER PUBLICATIONS

Washington Post, "2 More Beef Livers . . . " 8/20/72
Washington Post, "Incomplete Ban on DES Held Illegal" 9/13/72.

*Primary Examiner*—Norman Yudkoff
*Assistant Examiner*—Curtis P. Ribando

[57] ABSTRACT

A direct feeding supplement designed to cure or prevent in ruminants low blood serum magnesium and/or calcium levels, which low levels lead to the ailment, grass tetany. In order to incorporate sufficient magnesium to do the job, the solubility limit is exceeded in the aqueous system resulting in a suspension supplement. Previously, such suspensions would gel in short order and become useless. It has now been discovered that gelling can be prevented for substantial periods of time if the ammonium polyphosphate solution component of the suspension contains greater than about 70 percent polyphosphate species therein including substantial amounts of tripoly.

7 Claims, No Drawings

RUMINANT DIRECT FEEDING SUSPENSION SUPPLEMENT

This application is a continuation of our copending U.S. Pat. application Ser. No. 191,853, filed Oct. 22, 1971, for RUMINANT DIRECT FEEDING SUSPENSION SUPPLEMENT.

Our invention relates to an improved ruminant direct feeding supplement derived from the ammoniation of superphosphoric acid principally but not necessarily exclusively of the electric-furnace type, which supplement contains vital minerals such as nitrogen, phosphorus, magnesium, sulfur, calcium and other elements necessary to ruminants; more specifically our invention relates to such a direct feeding supplement wherein greater amounts of magnesium are incorporated therein (i.e., up to about 70 pounds per ton) than heretofore possible such that said supplement can directly provide individual ruminants with from about one to preferably about 2 ounces of Mg/day and at the same time prevent feeding thereto sufficient amounts of nonprotein nitrogen approaching the permissible levels short of toxicity; still more particularly our invention relates to a direct feeding supplement tailored to be eminently suitable to correct or prevent deficiencies in the diet of ruminants which lead to the ailment commonly referred to as grass tetany (hypomagnesemia). Ruminant animals, such as cattle, sheep, and goats, are of considerable economic importance in the world. They are excellent sources of food, fiber, and hides, and sometimes they are used to carry burdens. Perhaps of greatest importance is their ability as domestic animals to efficiently convert pasturage to protein. Sometimes, the natural foliage available to such animals is deficient in various elements such as nitrogen, phosphorus, magnesium, sulfur, and calcium, as well as some of the other nutrient elements that are important for the growth and health of an animal. Also, some grasses contain magnesium or other minerals which are not available to the animal. There is considerable interest in supplementing the diet of ruminant animals to overcome such deficiencies. Often an animal is confined to a limited feed area such as a feed lot. For this reason it cannot obtain the elements necessary to its diet. It is difficult to incorporate these elements in mineral blocks and other solid feed sources so that they will be palatable to the animal. Often the solid feeds such as grass and grain are deficient in vital elements.

In providing feed supplements one must consider many factors, such as the cost of the supplement and the sources of materials used. Although some materials are available at a reasonably low cost, if they are not properly utilized by the animal they become uneconomical sources because relatively large quantities of such material are required. For example, some grass feeds are very low in magnesium and calcium, and for the animal to obtain sufficient quantities of these minerals, it would have to be fed excessive quantities of this deficient grass or solid feed. Therefore, such practice would be an uneconomical method of feeding the animal its correct nutrient requirements.

It is advantageous to have the supplement in a fluid form such as a suspension. In the suspension substantial amounts of elements such as Mg, Ca, and S, which cannot normally be dissolved in aqueous medium, are suspended by a suspending agent. The advantage of having the supplement in a fluid form is that fluids are easier to transfer, mix, and measure than are the solid materials. Because of the ease of dispensing and measuring, it is possible to control accurately the intake of the animal. The fluid supplements of our invention are fed directly to the animal without dilution. It is preferable for the fluid to be stable during storage so that the materials suspended in it will not settle. Also, the suspension should not be excessively viscous and difficult to disperse.

Perhaps the most significant factor relating to the objectives of our invention to suspend the maximum amount of magnesium oxide (as well as calcium oxides or calcium carbonates and/or sulfur as elemental sulfur or ammonium sulfate) in our direct feeding supplement suspension. Inasmuch as the maximum permissible daily uptake by the individual ruminant of the feed supplement is determined to a great extent by the toxicity level of the nonprotein nitrogen therein (i.e., that supplied by the ammonia utilized in ammoniating said phosphoric acid), it is of utmost importance that such amounts of supplement carry to the ruminant at least the minimum daily requirement of Mg. Current tests and data show the maximum permissible amount of protein as equivalent nonprotein nitrogen should not exceed one-third of the total protein fed to the animal. At the same time, in order to provide complete protection it is necessary for this supplement to supply per day at least about 1 ounce of magnesium and preferably 2 or more ounces of magnesium per animal. (Epsom salts is no longer recommended as it is more costly per pound of actual magnesium and the magnesium therein is less available to the animals.) Therefore it is necessary to be able to produce and supply a direct feeding supplement of such a desired composition that the total daily intake thereof falls below the amount approaching toxic levels for nonprotein nitrogen and at the same time to supply the necessary daily dosages of magnesium. As is noted infra, we contemplate that, in most instances, our supplement will be fed by licking pot devices or the like. Therefore, the normal means for control of maximum daily intake per animal is obtained by adding to our supplement approximately 0.5 to 1.0 percent of such materials as ammonium sulfate and sodium chloride, which acts as a governor on the appetite of the ruminant and limits his intake.

Heretofore numerous approaches have been taken in the prior art relating to various types of liquid feed supplements such as, for example, that shown in U.S. Letters Patent 3,512,986, Snyder et al. Snyder et al. teach an improved ruminant liquid feed supplement made by a process wherein ammoniated superphosphoric acid derived from wet-process acid is utilized. The ammoniated superphosphoric acid of Snyder et al provides the desired nutrients of nitrogen and phosphorus, together with small amounts of soluble trace elements. Their liquid supplement is stable during storage, i.e., they teach that a precipitate does not form in the solution. One significant limitation of their teaching is that only minute quantities of magnesium and calcium can be dissolved in their phosphate solution. For example, in 10–34–0 solution with a polyphosphate content of 70 percent or less, the average solubility of magnesium is less than 0.2 percent by weight. Thus 1 ([1]TVA. New Developments in Fertilizer Technology. Proceedings of 8th Demonstration, page 8, table I.)

In most instances, it is preferable that ruminant feeds contain a significant quantity of magnesium and/or calcium. Nutritionists advise that at least 2 ounces of magnesium oxide be fed to each animal per day. Some of this magnesium oxide is obtained from the solid feeds, such as grass and grain, that the cattle receive. In our invention, the cattle would receive about 25 to 100 percent of the total magnesium oxide daily requirement from our suspension direct feeding supplement. Because only very small quantities of magnesium oxide (MgO) and calcium can be dissolved in the liquid supplement described in Snyder et al., this supplement cannot be considered a significant source of either magnesium or calcium. However, in our invention significant quantities of magnesium, calcium, and/or sulfur are suspended in aqueous media in such a way that they remain suspended and the fluid remains free-flowing with said elements readily available to the animal.

Our suspension direct feeding supplement is usually dispensed through special feed troughs which are equipped with wheels that dip into the liquid supplement. These feed troughs are often referred to as licking pots because the animal licks the supplement off the wheels which are partially submerged in the supplement. Therefore, our invention follows an approach which is different in objectives from that shown by Snyder et al. in that our supplement is fed directly to the animal as a fluid and not as solid feed which has been treated with only small amounts of Snyder's liquid supplement.

In the past it has been the general practice to endeavor to incorporate magnesium, calcium, and sulfur into solid feeds. However, it is difficult to add these materials uniformly to the solid feeds and to prevent segregation therein due to differences in particle size. In our invention, it is quite easy to uniformly incorporate the magnesium oxide, calcium, and sulfur into our suspension. Since the magnesium oxide, calcium, and sulfur are uniformly distributed throughout the fluid, it is easy to accurately feed the required daily amounts of magnesium, calcium, and sulfur to the animal. This is not possible with a solid feed because parts of it will be rich in these nutrients while others are deficient in same and therefore it is difficult to determine the exact amount of each nutrient being consumed by the animal.

Severe segregation and therefore lack of uniformity is developed in this prior-art practice of trying to incorporate fine magnesium oxide in feed supplements due to mismatch of particle sizes. This is borne out in the literature which teaches that in order to avoid segregation in the handling of mixtures of solid particles such as, for example, in bulk blending of fertilizers, it must be possible to match size distribution to the extent that the accumulative percentages retained on any given screen do not differ by more than about 15 to 20 percent. This is shown to be necessary in order to prevent severe segregation if all other precautions in handling bulk blending materials are followed. See, for example, *Agricultural and Food Chemistry*, January–February 1964, volume 12, pages 64–69 (TVA Reprint No. 354); *Farm Chemicals*, February 1964, pages 55 and 56 (TVA Reprint No. 357); *Agricultural Chemicals*, February 1965, pages 42, 46, 96, 98 (TVA Reprint No. 393); and *The Fertilizer Society in London Proceedings* No. 87, March 25, 1965.

When the magnesium deficiency becomes critical in the animal, the animal will suffer from a disease commonly referred to as grass tetany, or more technically, hypomagnesemia. Hypomagnesemia or grass tetany describes a condition of tetany (causing muscular spasms) that is found to occur in ruminants. Although this type of tetany has been a fairly common problem abroad for some time, in the last several years it has become more frequently reported in the United States. The general symptoms of hypomagnesemia are lack of coordination, staggering of the animal, a highly excitable state of activity, and general loss of appetite. As the ailment progresses, the ruminants display increased heartbeat, labored breathing, and excessive salivation. Finally, if the ailment is not checked, convulsions and death occur. Researchers have found a correlation between the occurrence of hypomagnesemia and the blood level of magnesium in animals afflicted therewith. The normal blood level of magnesium in a healthy animal is about 2 milligrams per 100 milliliters of blood serum. When hypomagnesemia develops this level is reduced by about half this amount. In addition, it has also been observed by researchers that a similar but not as pronounced reduction in the blood serum of the calcium level. Therefore, one of the particular advantages of our invention is to insure that the animal receives, in addition to nitrogen, phosphorus, trace elements, hormones and vitamins, the very important elements of magnesium, calcium and sulfur. Our invention provides a means of accurately measuring daily the elements introduced by our direct feeding suspension supplement.

One approach to correct the magnesium and calcium deficiencies is to correctly apply dolomitic limestone to the fields in which grass or grain is grown. However, in many instances, the liming process is more expensive than the addition of magnesium and calcium to the feed supplement. Often it is impossible to add this dolomitic limestone because of weather conditions, and frequently it is not added because of neglect. Therefore, oftentimes the die is cast for conditions under which hypomagnesemia will become prevalent and it is too late in the game to take preventive measures. The only alternative that remains is to force feed the ruminants (an expensive and uneconomical avenue) or to follow the practice of our invention. Also tetany-producing pastures often contain more than the minimum requirements of magnesium but the animal sometimes for some unknown reason cannot convert it to a usable form in his digestive system.

It is important to select materials for a supplement that will be palatable to the animal. Often the animal exhibits a preference for a material offered to it as a feed. A direct feeding suspension supplement should be palatable so that the animal will, of its own accord, ingest the proper quantity of the supplement. However, the supplement should not be so palatable that the animal will overfeed. In our invention, the animal finds the suspension to be palatable probably because of its molasses content, but overfeeding can be adjusted by the addition of ammonium sulfate and/or sodium chloride to the suspension. We have discovered that when the ammonium sulfate or sodium chloride is added to the product, the product becomes too viscous during storage unless the base solution (i.e., 11–37–0, infra) used in the feed supplement contains in excess of 70 percent polyphosphate. Our tests also show that when our supplement contains between 1.0 and 4.0 percent Mg, it does not become too viscous for easy handling and feeding. Our tests also show that if an ammonium polyphosphate solution, as for example, that described in Snyder et al., supra, is used the suspension will be viscous after only a few days of storage when either of the five following compounds is added in significant quantity (about 0.5 percent of the total supplement): sodium sulfate, sodium chloride, magnesium sulfate, magnesium oxide, and any of the many sources of lime (calcium oxide).

Snyder teaches that the base of his ammonium phosphate or ammonium polyphosphate feed supplement contains a maximum of only 70 percent polyphosphate. He teaches that a typical breakdown of the polyphosphate in this ammonium phosphate solution is 37 percent ammonium orthophosphate, 49 percent ammonium pyrophosphate, 8 percent ammonium tripolyphosphate, and 1 percent more condensed phosphates. We have found that his base solution does not have a sufficient quantity of ammonium tripolyphosphate, ammonium tetrapolyphosphate, and ammonium pentapolyphosphate to prevent the formation of thick gels in the feed supplement when magnesium and/or sodium and/or calcium compounds are added to be suspended in the feed supplement. We have now discovered that to suspend these solid compounds and avoid the gel formation in the fluids, it is necessary that the total polyphosphate content of the ammonium phosphate solution used in the supplement be in excess of 70 percent polyphosphate, and that tripolyphosphate should typically be about 20 percent or higher, the tetrapolyphosphate about 10 percent or higher, and the more condensed polyphosphates about 7 percent or higher. When this high-polyphosphate-content ammonium phosphate solution is used, gels do not form when magnesium, sodium, calcium, and other nutrients are suspended in the ammonium phosphate solution or in the suspension feed supplement in which it is incorporated.

In using a feed supplement, it is imperative that the supplement remain fluid and free-flowing. If gels form in it, it cannot be pumped, handled, and dispersed easily. For example, it cannot be pumped from a storage tank to a transport truck. It cannot be removed from the transport truck. If the gels form in the licking pots or feed troughs, the animal cannot remove it from the wheels of the pots, or the supplement will not stick onto the wheels.

In our invention, minerals are suspended in such a way that they may be dispersed into various types of direct feeding systems, such as licking pots. This is highly desirable when the animal is being fed in a confined feed lot. In this instance, it is particularly desirable to feed a fluid supplement directly to the animal.

It is therefore an object of the present invention to provide a ruminant direct feeding supplement containing significant amounts of magnesium, calcium and/or sulfur which is particularly useful in treating the symptoms of hypomagnesemia, which supplement is relatively low in cost and which may be fed directly to the ruminants without any requirement for dilution or adulteration thereof.

Still another object of the present invention is to provide a ruminant direct feeding supplement containing significant amounts of magnesium, calcium and/or sulfur which is particularly useful in treating the symptoms of hypomagnesemia, which is relatively low in cost, which may be fed directly to the ruminants without any requirement for dilution or adulteration thereof, which is of about a neutral pH, which is in liquid form, and which is highly stable during storage and subsequent handling, thereby being eminently suitable for direct application and ingestion by direct feeding means such as a licking pot or like device and easily susceptible to close metering and monitoring of the portions fed thereto and taken thereup.

A further object of the present invention is to provide a ruminant direct feeding supplement containing significant amounts of magnesium, calcium and/or sulfur, which is particularly useful in treating the symptoms of hypomagnesemia, which is relatively low in cost, which may be fed directly to the ruminants without any requirement for dilution or adulteration thereof, which is of about a neutral pH, which is in liquid form, which is highly stable during storage and subsequent handling, thereby being eminently suitable for direct application and ingestion by direct feeding means such as a licking pot or like device, and easily susceptible to close metering and monitoring of the portions fed thereto and taken thereup, and which feed supplement, in addition to being effective in treating and correcting the symptoms of said hypomagnesemia is so palatable to ruminants so as not to interfere substantially with the symbiotic microflora normally present in the digestive tract of said ruminants.

Still further and more general objects of the present invention will appear from the more detailed description set forth below, it being understood, however, that this more detailed description is given by way of illustration and explanation only and not by way of limitation since various changes therein may be made by those skilled in the art without departing from the spirit and scope of the present invention.

To fill criteria of the ease of handling and to avoid the formation of gels, a high-polyphosphate material produced by the processes outlined in U. S. Letters Patents 2,950,961 and 3,015,552, Striplin et al., may be used. Striplin et al. teach that the phosphoric acid used in the production of the high-polyphosphate-content ammonium phosphate solution would be produced, for example, in a furnace phosphoric acid plant. This same high-polyphosphate ammonium phosphate solution can be produced by a process outlined in copending U.S. Pat. application Ser. No. 126,680, filed Mar. 22, 1971, R. S. Meline, and assigned to the assignee of the present invention now T896,056. Meline teaches that a high-polyphosphate-content ammonium phosphate solution can be produced by a direct process in which all the phosphorus is supplied by wet-process phosphoric acid. The high-polyphosphate-content liquids resulting from these teachings of Striplin et al. and of Meline and used in our direct feeding supplement would have a total ammonium polyphosphate content in excess of 70 percent.

In order that those skilled in the art may better understand how the present invention can be practiced, the following examples of methods and processes we have used in the production of such ruminant direct feeding supplements by the ammoniation of phosphoric acid under conditions wherein the polyphosphate content resulting therein is in excess of at least 70 percent and wherein substantial amounts (from about one-half percent upwards to preferably about 2 percent by weight) of principally magnesium oxide as well as, if desired, like amounts of calcium oxide and flowers of sulfur are incorporated therein to cure and correct the symptoms of hypomagnesemia, are given by way of illustration and not by way of limitation.

The high-polyphosphate ammonium phosphate solution used in our supplement contains between about 11 and 14 percent nitrogen and between about 37 and 47 percent $P_2O_5$. Preferably the ammonium pyrophosphate content of the product should be about 35 percent, the ammonium tripolyphosphate content in excess of 20 percent, the ammonium tetrapolyphosphate content in excess of 10 percent, and the more condensed phosphates in excess of 6 percent. A typical high-polyphosphate-content ammonium phosphate solution having the following physical and chemical properties (for purposes of convenience will hereinafter be referred to as Solution No. 1) was found to be useful in attaining the objectives of our invention. Note that the sum of the species of polyphosphates equal 80 percent of the total $P_2O_5$.

Solution No. 1

Chemical and Physical Properties of Ammoniated Superphosphoric Acid[1] Solution for Liquid or Suspension Feed Supplements

| | |
|---|---|
| Nitrogen content, % N by weight | 11 |
| Phosphate content, % $P_2O_5$ by weight | 37 |
| Density, pounds per gallon at 75° F. | 11.7 |
| Total polyphosphate content, % total $P_2O_5$ | 80 |
| Species of polyphosphate, % total $P_2O_5$ | |
| Ammonium pyrophosphate | 38 |
| Ammonium tripolyphosphate | 24 |
| Ammonium tetrapolyphosphate | 11 |
| Ammonium pentapolyphosphate | 4.5 |
| Other highly condensed polyphosphates | 2.5 |
| Viscosity, centipoises at 75° F. | 80 |
| Storage temperature | About 0° F. |
| pH | 5.8–6.2 |

[1]This base solution can be produced with superphosphoric acids of varying polyphosphate contents, i.e., with an acid having a polyphosphate content as high as 90 percent. Several processes can be used to produce this solution from either wet-process (U.S. Pat. No. 3,382,059, Getsinger) or furnace superphosphoric acid (U.S. Pat. No. 2,950,961, Striplin et al.). In some processes the solution can be produced from a combination of furnace superphosphoric acid and wet-process orthophosphoric acid (54 percent $P_2O_5$). (See for instance U.S. Pat. No. 3,507,614, Striplin et al.) These several processes will produce an ammonium polyphosphate base solution which has a high polyphosphate content (in excess of 70 percent polyphosphate).

Solution No. 1 has remained stable for at least 90 days at room temperature. It has been stored satisfactorily at temperatures well below 0° F. It will not cause burning of the human skin on accidental contact, and it can be easily washed from the skin.

EXAMPLE I

Storage tests were made with three suspension feed supplements of varying protein content. In the first test, magnesium oxide and ammonium sulfate were suspended in a solution of molasses, urea, and high-polyphosphate-content 11–37–0 (i.e., Solution No. 1). The formulation used in this test is tabulated below:

Formulation FF-3 for Suspension Fertilizer

| Protein, % | 32.5 |
|---|---|
| Formulation | Pounds per ton of product |
| Water | 268 |
| Suspending clay (attapulgite or sodium bentonite)[1] | 20 |
| Urea (microprills)[2] | 172 |
| 11–37–0 — Solution No. 1 | 135 |
| Molasses | 1,305 |
| Ammonium sulfate | 20 |
| Trace minerals: zinc, etc. | 10 |
| Sodium chloride | 30 |
| Vitamin premix (A, D, and E) | 5 |

Formulation FF-3 for Suspension Fertilizer-Continued

| | |
|---|---|
| Magnesium oxide[3] | 35 |

[1]Sodium bentonite from Black Hills of South Dakota. Pregel clay in water; Attapulgite clay from Attapulgus, Georgia.
[2]Dissolve urea in clay-water solution or use a 50 percent urea solution.
[3]Use technical-grade magnesium oxide.

In producing a batch of suspension, the materials were added to a mix tank in the sequence shown in the above formulation. Therefore, the magnesium oxide was added at the end of mixing. The mix tank used for the production of these suspensions consists of a 1,000-gallon tank that is mounted on scales. The materials are weighed in the batch mix tank. Agitation is provided by recirculating liquid in the tank. The tank is also equipped with an agitator. The suspension produced by the formulation shown in Example I remained fluid for several months. This was unexpected since, when the solution described by Snyder et al., supra (less than 70 percent poly) was used instead of the Solution No. 1 in this formulation, the fluid became very viscous at the end of only three days of storage. It formed a gel and its viscosity was extremely high so that it could not be pumped, handled and dispensed. Therefore, these results show that to produce a magnesium and/or calcium suspension, it is imperative that the polyphosphate content of the ammonium polyphosphate solution be in excess of 70 percent. When it is less than 70 percent, the solution becomes viscous within a few days. This supplement contains about 1.7 percent MgO, which is of sufficient quantity to correct a magnesium dietary deficiency in many ruminant animals. It also has a nitrogen:sulfur weight ratio of 11.6. This ratio can be varied upward or downward as required. The total phosphorus content is 1.1 percent. This is an excellent phosphate content for this type of supplement. However, this could also be varied from 0.5 percent P to 4 percent P by varying the amount of high polyphosphate content (71 percent or higher polyphosphate content) used in the suspension supplement. The pH of this supplement is between 6.0 and 9.0. At the higher pH, the suspension is not so palatable that the animal will overfeed, and the pH can be used to control the intake of the animal. This pH can be adjusted by varying the pounds of high-polyphosphate-content ammonium phosphate solution used in the formulation per pound of magnesium oxide used.

EXAMPLE II

The nutrition of some animals requires that some calcium as well as magnesium be included in the feed supplement. Tests were made with a suspension feed supplement which contained calcium. A typical formulation for this type of supplement is tabulated below:

FORMULATION FOR SUSPENSION FEED SUPPLEMENT CONTAINING CALCIUM AND MAGNESIUM

| | |
|---|---|
| Protein, % | 35 |
| Magnesium, % | 0.6 |
| Calcium, % | 1.6 |
| Formulation | Pounds per ton of product |
| Water | 197 |
| Suspending clay (attapulgite or sodium bentonite)[1] | 20 |
| Urea (microprills)[2] | 189 |

FORMULATION FOR SUSPENSION FEED SUPPLEMENT CONTAINING CALCIUM AND MAGNESIUM—Continued

| | |
|---|---|
| High-polyphosphate-content 11-37-0 (Solution No. 1) | 167 |
| Molasses[3] | 1,262 |
| Ammonium sulfate (21% N, 24% sulfur) | 10 |
| Sodium chloride | 50 |
| Diethylstilbestrol (20 gms. per pound)[4] | 0.5 |
| Vitamin premix (A, D, and E) | 0.5 |
| Trace-mineral mix (zinc, etc.) | 5 |
| Dolomite limestone (30% CaO, 21% MgO) | 99 |

[1] Sodium bentonite from Black Hills of South Dakota. Pregel clay in water; attapulgite clay from Attapulgus, Georgia.
[2] Dissolve urea in clay-water solution or use a 50 percent urea solution.
[3] Contains 1.26 percent CaO.
[4] Hormone mixture.

The suspension contains 1.4 percent phosphorus, 1.6 percent calcium, and 0.6 percent magnesium. It has a nitrogen:sulfur ratio of 17.6 percent. This is an excellent nitrogen:sulfur ratio for good nutrition; however, this ratio can also be varied by varying the amount of ammonium polyphosphate used and the amount of sulfate suspended in the fluid. This is an excellent supplement and is highly palatable to ruminant animals. The mineral content of these supplements is excellent to prevent calcium and magnesium deficiencies in the diet of ruminant animals. It uses a very low cost source of magnesium and calcium, namely dolomite.

EXAMPLE III

The protein content of each of these supplements could be increased by increasing the quantities of urea and ammonium sulfate used. For example, in a third test a suspension feed supplement having a protein content of 68 percent was made. The formulation for this supplement is tabulated below:

FORMULATION FOR SUSPENSION FEED SUPPLEMENT OF HIGH PROTEIN CONTENT, CALCIUM AND MAGNESIUM

| | |
|---|---|
| Protein, % | 68 |
| Magnesium, % | 1.2 |
| Calcium, % | 2.4 |

| Formulation | Pounds per ton of product |
|---|---|
| Water | 394 |
| Suspending clay (attapulgite or sodium bentonite)[1] | 20 |
| Urea (microprills)[2] | 379 |
| High-polyphosphate-content 11-37-0 (Solution No. 1) | 332 |
| Molasses[3] | 546 |
| Ammonium sulfate | 20 |
| Sodium chloride | 99 |
| Diethylstilbestrol (20 gms. per pound)[4] | 1 |
| Vitamin premix (A, D, and E) | 1 |
| Trace-mineral mix (zinc, etc.) | 10 |
| Dolomite limestone (30% CaO, 21% MgO) | 198 |

[1] Sodium bentonite from Black Hills of South Dakota. Pregel in water. Attapulgite clay from Attapulgus, Georgia.
[2] Dissolve urea in clay-water solution or use a 50 percent urea solution.
[3] Contains 1.26 percent CaO.
[4] Hormone Mixture.

This suspension feed supplement has a high protein content and contains 2.4 percent calcium and 1.2 percent magnesium. It would be impossible to dissolve this quantity of calcium and magnesium in the feed supplement as taught in Snyder, supra. It must be suspended in the supplement and the supplement must contain a high-polyphosphate-content ammonium polyphosphate base solution such as the 11-37-0 described above. This feed supplement has a phosphorus content of 2.7 percent and a sulfur content of 0.33 percent. Its nitrogen:sulfur ratio is 33.2. This product has been stored for several months and has remained free-flowing during storage. Little or no settling of dolomite limestone has occurred. It is palatable to ruminant animals and has the necessary elements for cattle that have a diet deficient in phosphorus, sulfur, magnesium, and calcium.

EXAMPLE IV

Sometimes the animal does not require magnesium but does require larger quantities of calcium than is supplied by the ration in Example III. In these tests, no magnesium compounds were used, i.e., calcitic limestone was used instead of dolomitic limestone.

FORMULATION SUSPENSION FEED SUPPLEMENT OF HIGH CALCIUM AND PROTEIN CONTENT

| | |
|---|---|
| Protein, % | 68 |
| Calcium, % | 4.1 |

| Formulation | Pounds per ton of Product |
|---|---|
| Water | 394 |
| Suspending clay (attapulgite or sodium bentonite)[1] | 20 |
| Urea (microprills)[2] | 379 |
| High-polyphosphate-content 11-37-0 (Solution 1) | 332 |
| Molasses[3] | 546 |
| Ammoniumsulfate | 20 |
| Sodium chloride | 99 |
| Diethylstilbestrol (20 gms. per pound)[4] | 1 |
| Vitamin premix (A, D, and E) | 1 |
| Trace-mineral mix (zinc, etc.) | 10 |
| Calcitic limestone (38% CaO) | 198 |

[1] Sodium bentonite from Black Hills of South Dakota. Pregel in water. Attapulgite clay from Attapulgus, Georgia.
[2] Dissolve urea in clay-water solution or use a 50 percent urea solution.
[3] Contains 1.26 percent CaO.
[4] Hormone mixture.

The suspension produced from the above formulation is an excellent material to correct a calcium deficiency in animals. A calcium deficiency will cause a disease commonly referred to as milk fever. It is caused by a calcium deficiency in the bloodstream of the animal. It also causes the animal to be nervous, sluggish, and irritable. It causes dairy cattle to be low producers of milk. This suspension remained fluid for several months and was easy to dispense and handle.

EXAMPLE V

Sometimes no calcium is required other than that supplied by a high-calcium content molasses. The following example is a ration of this type:

FORMULATION FOR FEED SUPPLEMENT WITH MAGNESIUM AND LOW CALCIUM CONTENT

| | |
|---|---|
| Protein, % | 30 |
| Calcium, % | 0.6 |
| Magnesium, % | 1.0 |

| Formulation | Pounds per ton of product |
|---|---|
| Water | 181 |
| Clay (attapulgite or sodium bentonite)[1] | 20 |
| Urea (microprills)[2] | 160 |
| High-polyphosphate-content 12-44-0[3] | 105 |
| Molasses[4] | 1417 |
| Salt | 15 |
| Ammonium sulfate (21% N) | 12 |
| Trace minerals | 5 |
| Magnesium oxide (by Mg.Ox. 90% MgO) | 35 |
| Vitamin premix (A, D, and E) | 0.5 |

¹Sodium bentonite from Black Hills of South Dakota. Pregel clay in water; attapulgite clay from Attapulgus, Georgia.
²Dissolve urea in clay-water solution or use 50 percent urea solution.
³High-polyphosphate material total polyphosphate content equal 80%; ammonium pyrophosphate 30%; ammonium tripolyphosphate 24%; ammonium tetrapolyphosphate 11%; ammonium pentapolyphosphate and other highly condensed polyphosphate 2.5%.
⁴Molasses contains 1.26% CaO.

The 12-44-0 used in this formulation is also a high polyphosphate material; however, it has a lower pH and the suspensions produced from it usually have a pH of about 6.0. This formulation was used in licking pots to serve cows that were restricted to a feed lot. Each of the animals was consuming about 2 pounds of supplement per day. Therefore, the supplement does not appear to be too palatable for over-consumption and with the solid feed that the animal normally receives, their diet includes a sufficient amount of magnesium.

EXAMPLE VI

As has been stated several times, we have discovered that it is highly important in carrying out the objects of this invention that the ammonium polyphosphate solution must contain in excess of 70 percent of its total $P_2O_5$ as ammonium polyphosphate species, i.e., pyro-, tripoly-, tetra-, etc. We have determined this criteria in a number of tests; however, in order to demonstrate the criticality of this feature of our invention, we prepared 9 additional solutions, i.e., Nos. 2-10, to be compared with solution No. 1. Each of these solutions was prepared by ammoniating a highly concentrated furnace acid as in Striplin U.S. Pat. No. 2,950,961, supra. The ammoniation procedure was carried out in a manner such that these nine solutions had total $P_2O_5$ polyphosphate levels in decreasing increments of 2 percentage points from the 80 percent total of solution No. 1. In the testing procedure, the 10 solutions were then tested in two ways. In procedure A, sufficient magnesium oxide was introduced into each of the solutions to account for 2 percent by weight thereof. Subsequently, a portion of each of these mixtures of ammoniated phosphoric acids with magnesium oxide was set aside for storage tests to determine the time lapse before gel formation occurred. In procedure B, the remaining portion of each of these test mixtures was formulated on a small-scale basis to produce a formulation simulating the proportioning shown in our example I, supra (with the exception, of course, of the solution No. 1 being used in only one of these tests and the other 9 solutions substituted therefor in the remaining tests). The resulting suspensions were then also set aside for storage tests to determine the time lapse before gel formation occurs. Those samples of the simulated fertilizer suspensions which yielded the desirable storage characteristics (i.e., no gel formation in 90 days) shown in the table below were fed to a small herd of beef cattle owned by one of our associates. Although these tests were not on a large-scale basis, they did fully indicate that all of the simulated suspensions fed were palatable to the animals.

TABLE I

| Solution No. | Polyphosphate content % of total $P_2O_5$ | Procedure A Storage test with 2 MgO | Procedure B Storage test simulated suspension as in Example 1 |
|---|---|---|---|
| 1 | 80 | O.K. >90 days | O.K. >90 days |
| 2 | 78 | O.K. >90 days | O.K. >90 days |
| 3 | 76 | O.K. >90 days | O.K. >90 days |
| 4 | 74 | O.K. >90 days | O.K. >90 days |
| 5 | 72 | O.K. >90 days | O.K. >90 days |
| 6 | 70 | Gel at 73 days | Gel at 78 days |
| 7 | 68 | Gel at 61 days | Gel at 46 days |
| 8 | 66 | Gel at 33 days | Gel at 20 days |
| 9 | 64 | Gel at 12 days | Gel at 8 days |
| 10 | 62 | Gel at 1st day | Gel at 1st day |

EXAMPLE VII

In Example VI above, it will be noted that our starting acid for preparing the solutions was of the electric-furnace type which has only negligible amounts of metallic impurities such as the oxides of iron and aluminum. In the tests of the instant example, instead of using substantially 100 percent electric-furnace superphosphoric acid for ammoniation to prepare the high polyphosphate solution, i.e., Striplin U.S. Pat. No. 2,950,961, supra, we used a blend of 80 percent furnace super acid and 20 percent wet acid which had been converted to the super acid range as in the process of Striplin et al. U.S. Pat No. 3,507,614. That is to say that sufficient wet-process orthophosphoric acid (0-54-0) was fed to the thermal acid plant in the manner of Striplin U.S. Pat. No. 3,507,614 to supply 20 percent of the total phosphorus or $P_2O_5$ values in the end product acid. The wet ortho acid employed in this procedure had the following analysis, it being understood that this is all ortho acid, i.e., no condensed species of polyphosphate therein.

| Wet-Acid Analysis | Percent by Weight |
|---|---|
| Total $P_2O_5$ | 54.0 |
| Ortho $P_2O_5$ | 54.0 |
| $Al_2O_3$ | 1.6 |
| $Fe_2O_3$ | 1.1 |
| MgO | 0.55 |
| $SO_3$ | 2.6 |
| Fluorine | 0.92 |
| Water-insolutble solids | 0.7 |
| CaO | 0.06 |

The resulting 80-20 super acid blend before ammoniation was analyzed for impurities, most of which were derived from the wet acid added thereto, and was analyzed for the specie distribution of polyphosphates therein. This analysis for the 80-20 blend is as follows:

| Complete Analysis | Percent by Weight | Species | Percent of Total $P_2O_5$ |
|---|---|---|---|
| Total $P_2O_5$ | 78.7 | Total $P_2O_5$ | 78.7 |
| Ortho $P_2O_5$ | 13.3 | Ortho $P_2O_5$ | 16.6 |
| $Al_2O_3$ | 0.53 | Pyro | 38.5 |
| $Fe_2O_3$ | 0.24 | Tripoly | 23.5 |
| MgO | 0.16 | Tetra poly | 11.5 |
| $SO_3$ | 0.65 | Penta poly | 5.4 |
| Fluorine | 0.21 | Other | 4.5 |
| Water-insoluble solids | Nil | | |

Subsequently the super acid 80–20 blend was ammoniated to produce a 11–37–0 solution high in polyphosphate species. This 11–37–0 solution is very similar in its method of preparation and in its storage characteristics to solution No. 1, supra, even though a portion of the phosphorus therein was supplied from wet-process orthophosphoric acid. For such comparison with our solution No. 1, supra, the analysis of the 11–37–0 high polyphosphate solution of the instant example is as follows:

| Species Analysis | Percent by Weight | Regular Analysis | Percent by Weight |
|---|---|---|---|
| Nitrogen | 11.1 | Total nitrogen | 11.4 |
| Total $P_2O_5$ | 36.7 | Nitrate nitrogen | nil |
| | Percent of Total $P_2O_5$ | Total $P_2O_5$ | 36.7 |
| Ortho $P_2O_5$ | 20.0 | Ortho $P_2O_5$ | 7.3 |
| Pyro $P_2O_5$ | 38.7 | Fluorine | 0.13 |
| Tripoly | 24.3 | Mgo | 0.05 |
| Tetra poly | 10.2 | $Al_2O_3$ | 0.22 |
| Penta poly | 4.2 | $Fe_2O_3$ | 0.21 |
| Hexa poly | 1.6 | | |
| Other | 1.0 | | |

Using this solution, additional polyphosphate solutions having the same polyphosphate contents and magnesium oxide contents as the solutions 1–10 in Table I, Example VI, supra, were produced and tested as in Procedures A and B of that example. The storage characteristics of the solutions again indicated the break point for no gelling after 90 days to be between 70 and 72 percent polyphosphate.

EXAMPLE VIII

The procedures followed in Example VII above were repeated except that instead of producing an 80–20 blend, twice as much of the phosphorus values was derived from ortho wet acid to produce a 60–40, to wit, 60 percent of its $P_2O_5$ from electric-furnace acid and 40 percent from a wet-process ortho acid of the same analysis and source as in Example VII, supra. Storage tests, i.e., procedures A and B supra, indicated once again the break point for no gelling after 90 days of storage to be between 70 and 72 percent polyphosphate. Since this 60–40 blend appears to be the maximum as far as utilization of wet-process acid is concerned, as taught by Striplin et al. U.S. Pat. No. 3,507,614, no further tests were carried out for blends more dilute in electric-furnace acid component than the 60–40 blend.

EXAMPLE IX

In this example, two sources of magnesium and one source of calcium were used. The sources of magnesium were magnesium oxide and magnesium chloride hexahydrate ($MgCl_2 \cdot 6H_2O$). The source of calcium was a high-calcium content molasses.

FORMULATION FOR SUSPENSION FEED SUPPLEMENT

| | |
|---|---|
| Protein, %[1] | 30.4 |
| Magnesium,% | 1.7 |
| Calcium, % | 0.6 |
| Phosphorus, % | 1.04 |
| Sugar, % | 30.6 |

| Formulation | Pounds per ton of product |
|---|---|
| Water | 205 |
| Clay[2] | 20 |
| Urea | 150 |
| 12-44-0 (ammonium polyphosphate solution) | 105 |
| Solubles (fish, whey, and corn distilleries) | 50 |
| Salt (NaCl) | 5 |
| Magnesium chloride hexahydrate ($MgCl_2 \cdot 6H_2O$)[3] | 140 |
| Molasses | 1,277 |
| Ammonium sulfate (21% N, 24% S) | 12 |
| Trace minerals | 5 |
| Magox (90% MgO) | 31 |
| Vitamins | 0.5 |
| N:S ratio[4] | 15 |

[1]Includes equivalent protein and crude protein in solubles and molasses. Equivalent protein equals (N from urea plus N from 11-37-0)×6.24.
[2]Sodium bentonite clay was used in formulation; attapulgite clay may also be used.
[3]Technical grade; contains 11.96 percent Mg and 19.8 percent MgO.
[4]Does not include surfur in trace minerals.

This formulation is uniquely different from the formulations of the previous examples in that magnesium chloride hexahydrate was used. In the above formulation, 50 percent of the magnesium is supplied by magnesium oxide (Magox) and 50 percent by magnesium chloride hexahydrate ($MgCl_2 \cdot 6H_2O$).

The product was found to be palatable and an excellent source of magnesium and calcium. The phosphorus content is about one percent, and it will correct a dietary deficiency of phosphorus. The sulfur was supplied as low-cost ammonium sulfate, and the resulting N:S ratio in the product was 15.0 which is a desirable ratio for cattle which were fed this product. Feed trials show that angus cows wil not excessively consume the product.

EXAMPLE X

After sifting and winnowing through the data and results of the tests and operations of our new, novel, and improved direct feeding ruminant supplement including the examples given supra as well as the results of other tests we have made but have not reported in detail, we now present the acceptable and preferred parameters and variables for our supplement in table II below:

TABLE II

| | Percent by Weight | |
|---|---|---|
| Material | Operable range | Preferred range |
| Added water | 10–25 | 13–19 |
| Clay | 0.5–3 | 1–2 |
| Urea | 5–25 | 10–19 |
| 11-37-0 (or 12-44-0) | 3–30 | 3–20 |
| Molasses (about 7% protein) | 20–65 | 26–60 |
| Ammonium sulfate | 0.2–2.0 | 0.2–1 |
| Sodium chloride | 0.2–3.0 | 0.2–2.5 |
| Diethylstilbestrol (20 grams per lb.) | 0–0.05 | 0.025–0.05 |
| Vitamin premix (A, D, and E) | 0–0.05 | 0.025–0.05 |
| Trace-mineral mix | 0–0.05 | 0.025–0.05 |
| Limestone | 0–15 | 0–10 |
| Non-protein nitrogen[1](calc.) | 2.6–14.8 | 4.9–10.9 |

[1]Non-protein nitrogen=N from urea (46%)+N from 11-37-0 (11%)=0.46 (5-25%)+0.11 (3–30%). Note: 2 lbs. of above formulation will supply up to one-third of the total protein requirement of the ruminant per day.

While we have shown and described particular embodiments of our invention, modifications and variations thereof will occur to those skilled in the art. We wish it to be understood, therefore, that the appended claims are intended to cover such modifications and variations that are within the true scope and spirit of the invention.

What we claim as new and desire to secure by letters patent of the United States is:

1. A direct feeding animal feed supplement eminently suitable for correcting and/or preventing deficiencies in the diet of ruminants, said deficiencies causing the occurrence of symptoms of hypomagnesemia which comprises in terms of percent by weight of said supplement:
   a. water in amounts ranging from about 10 to about 25 percent;
   b. clay suspending agent selected from the group consisting of attapulgite, bentonite, and mixtures thereof, in the amounts ranging from about 0.5 to about 3 percent;
   c. urea in amount ranging from about 5 to about 25 percent;
   d. in amounts ranging from about 3 to about 30 percent ammoniated superphosphoric acid having at least 70 percent of the $P_2O_5$ values therein as condensed ammoniated polyphosphoric acid species including pyrophosphoric acid, tripolyphosphoric acid, as well as species more condensed than said tripolyphosphoric acid;
   e. at least about 20 percent of the total $P_2O_5$ present in said ammoniated superphosphoric acid in (d) supra being present as said tripolyphosphoric acid species;
   f. aqueous soluble ruminant edible sucrose material including molasses (based on 7 percent protein content) in the amounts ranging from about 20 to about 65 percent;
   g. overfeeding preventative selected from the group consisting of ammonium sulfate, sodium chloride, and mixtures thereof, in amounts ranging from about 0.2 to about 2.0 percent for said ammonium sulfate and from about 0.2 to about 3.0 percent for said sodium chloride; and
   h. MgO, with at least a portion of said MgO suspended therein, ranging from about 0.5 to about 2.0 percent;
   said feed supplement being further characterized by the fact that the predetermined quantities of nonprotein nitrogen derived from said urea and said ammoniated superphosphoric acid in items (c) and (d) supra are such that there is provided a direct feeding supplement containing sufficient values of magnesium and limited values of said nonprotein nitrogen in relation to the protein nitrogen supplied by the bulk diet to the ruminant, that ingestion of said supplement by the ruminant will ensure sufficient magnesium in the blood serum thereof to prevent and/or correct occurrence of hypomagnesemia and at the same time the quantities of nonprotein nitrogen present therein are held to predetermined levels such that ingestion of the supplement is compatible with the metabolic characteristics of said ruminant; said predetermined quantities of said nonprotein nitrogen totaling from about 2.6 to about 14.8 percent by weight of said feed supplement.

2. The direct feeding supplement for ruminants according to claim 1 wherein the ammoniated superphosphoric acid contains in the range from about 70 to 80 percent by weight of its total $P_2O_5$ content as said ammoniated polyphosphoric acid species.

3. The direct feeding supplement for ruminants according to claim 1 wherein from about 60 to 100 percent of the total $P_2O_5$ content of said aqueous ammoniated superphosphoric acid is supplied from acid of the electric furnace type and the remainder from acid of the wet-process type.

4. The direct feeding supplement for ruminants according to claim 1 wherein from about 80 to 100 percent of the total $P_2O_5$ content of said aqueous ammoniated superphosphoric acid is supplied from acid of the electric furnace type and the remainder from acid of the wet-process type.

5. The direct feeding supplement for ruminants according to claim 1, wherein in addition to said quantities of magnesium oxide there is also present calcium oxide in the range from about 0.5 to about 2.0 percent by weight based on the weight of said feed supplement.

6. A direct feeding animal feed supplement eminently suitable for correcting and/or preventing deficiencies in the diet of ruminants, said deficiencies causing the occurrence of symptoms of hypomagnesemia which comprises in terms of percent by weight of said supplement:
   a. water in amounts ranging from about 13 to about 19 percent;
   b. clay suspending agent selected from the group consisting of attapulgite, bentonite, and mixtures thereof, in the amounts ranging from about 1 to about 2 percent;
   c. urea in amount ranging from about 5 to about 25 percent;
   d. in amounts ranging from about 3 to about 20 percent ammoniated superphosphoric acid having at least 70 percent of the $P_2O_5$ values therein as condensed ammoniated polyphosphoric acid species including pyrophosphoric acid, tripolyphosphoric acid, as well as species more condensed than said tripolyphosphoric acid;
   e. at least about 20 percent of the total $P_2O_5$ present in said ammoniated superphosphoric acid in (d) supra being present as said tripolyphosporic acid species;
   f. aqueous soluble ruminant edible sucrose material including molasses (based on 7 percent protein content) in the amounts ranging from about 26 to about 60 percent;
   g. overfeeding preventative selected from the group consisting of ammonium sulfate, sodium chloride, and mixtures thereof, in amounts ranging for said ammonium sulfate from about 0.2 to about 1.0 percent and for said sodium chloride from about 0.2 to about 2.5 percent; and
   h. MgO, with at least a portion of said MgO suspended therein, ranging from about 0.5 to about 2.0 percent;
   said feed supplement being further characterized by the fact that the predetermined quantities of nonprotein nitrogen derived from said urea and said ammoniated superphosphoric acid in items (c) and (d) supra are such that there is provided a direct feeding supplement containing sufficient values of magnesium and limited values of said nonprotein nitrogen in relation to the protein nitrogen supplied by the bulk diet to the ruminant, that ingestion of said supplement by the ruminant will ensure sufficient magnesium in the blood serum thereof to prevent and/or correct occurrence of hypomagnesemia and at the same time the quantities of nonprotein nitrogen present therein are held to predetermined levels such that ingestion of the supplement is compatible with the metabolic characteristics of said ruminant; said predetermined quantities of said nonprotein nitrogen totaling from about 4.9 to about 10.9 percent by weight of said feed supplement.

7. A direct feeding animal feed supplement eminently suitable for correcting and/or preventing deficiencies in the diet of ruminants, said deficiencies causing the occurrence of symptoms of hypomagnesemia which comprises in terms of percent by weight of said supplement:

a. water in amounts ranging from about 10 to about 25 percent;
b. clay suspending agent selected from the group consisting of attapulgite, bentonite, and mixtures thereof, in the amounts ranging from about 0.5 to about 3 percent;
c. urea in amount ranging from about 5 to about 25 percent;
d. in amounts ranging from about 3 to about 30 percent ammoniated superphosphoric acid having at least 70 percent of the $P_2O_5$ values therein as condensed ammoniated polyphosphoric acid species including pyrophosphoric acid, tripolyphosphoric acid, as well as species more condensed than said tripolyphosphoric acid;
e. at least about 20 percent of the total $P_2O_5$ present in said ammoniated superphosphoric acid in (d) supra being present as said tripolyphosphoric acid species;
f. aqueous soluble ruminant edible sucrose material including molasses (based on 7 percent protein content) in the amounts ranging from about 20 to about 65 percent;
g. overfeeding preventative selected from the group consisting of ammonium sulfate, sodium chloride, and mixtures thereof, in amounts ranging from about 0.2 to about 2 percent for said ammonium sulfate and from about 0.2 to about 3 percent for said sodium chloride; and
h. $MgCl_2 \cdot 6H_2O$, with at least a portion of said $MgCl_2 \cdot 6H_2O$ suspended therein, ranging from about 0.5 to about 2.0 percent;

said feed supplement being further characterized by the fact that the predetermined quantities of nonprotein nitrogen derived from said urea and said ammoniated superphosphoric acid in items (c) and (d) supra are such that that there is provided a direct feeding supplement containing sufficient values of magnesium and limited values of said nonprotein nitrogen in relation to the protein nitrogen supplied by the bulk diet to the ruminant, that ingestion of said supplement by the ruminant will ensure sufficient magnesium in the blood serum thereof to prevent and/or correct occurrence of hypomagnesemia and at the same time the quantities of nonprotein nitrogen present therein are held to predetermined levels such that ingestion of the supplement is compatible with the metabolic characteristics of said ruminant; said predetermined quantities of said nonprotein nitrogen totaling from about 2.6 to about 14.8 percent by weight of said feed supplement.

* * * * *